United States Patent [19]

Heise et al.

[11] Patent Number: 4,522,941

[45] Date of Patent: Jun. 11, 1985

[54] METHOD OF CONTROLLING THE DISTRIBUTION OF A COATING MATERIAL UPON THE SURFACE OF A SUPPORT

[75] Inventors: Michael S. Heise, Bath, N.Y.; Christopher S. Tucker, Strafford, Pa.; James A. Schwarz, Fayetteville, N.Y.

[73] Assignee: Syracuse University, Syracuse, N.Y.

[21] Appl. No.: 514,927

[22] Filed: Jul. 18, 1983

[51] Int. Cl.³ .................. B01J 21/04; B01J 23/42; B01J 23/44
[52] U.S. Cl. .................................... 502/333; 502/334
[58] Field of Search .................. 502/333, 334, 339

[56] References Cited

U.S. PATENT DOCUMENTS

| | | | |
|---|---|---|---|
| 2,927,088 | 3/1960 | Michalko et al. | 502/333 |
| 3,360,330 | 12/1967 | Hoerstra | 502/306 |
| 4,152,301 | 5/1979 | Summers et al. | 502/333 |
| 4,374,047 | 2/1983 | Bozon et al. | 502/339 |

*Primary Examiner*—W. J. Shine
*Attorney, Agent, or Firm*—Bruns and Wall

[57] ABSTRACT

A method for controlling the adsorption of materials from an aqueous solution onto a support. Ingredients selected from three identified classes are added in controlled amounts to the solution to generate a desired concentration profile.

2 Claims, 10 Drawing Figures

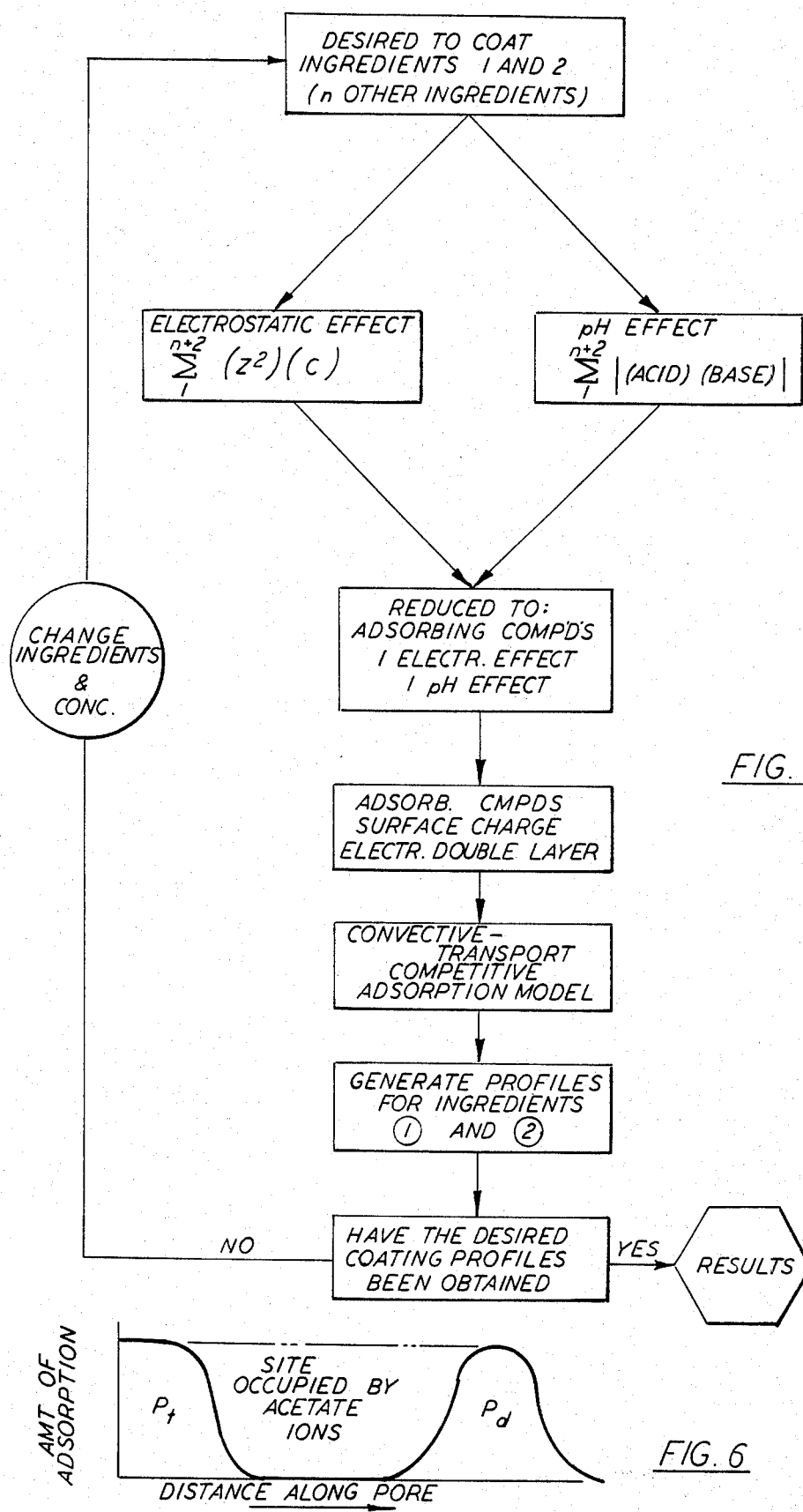

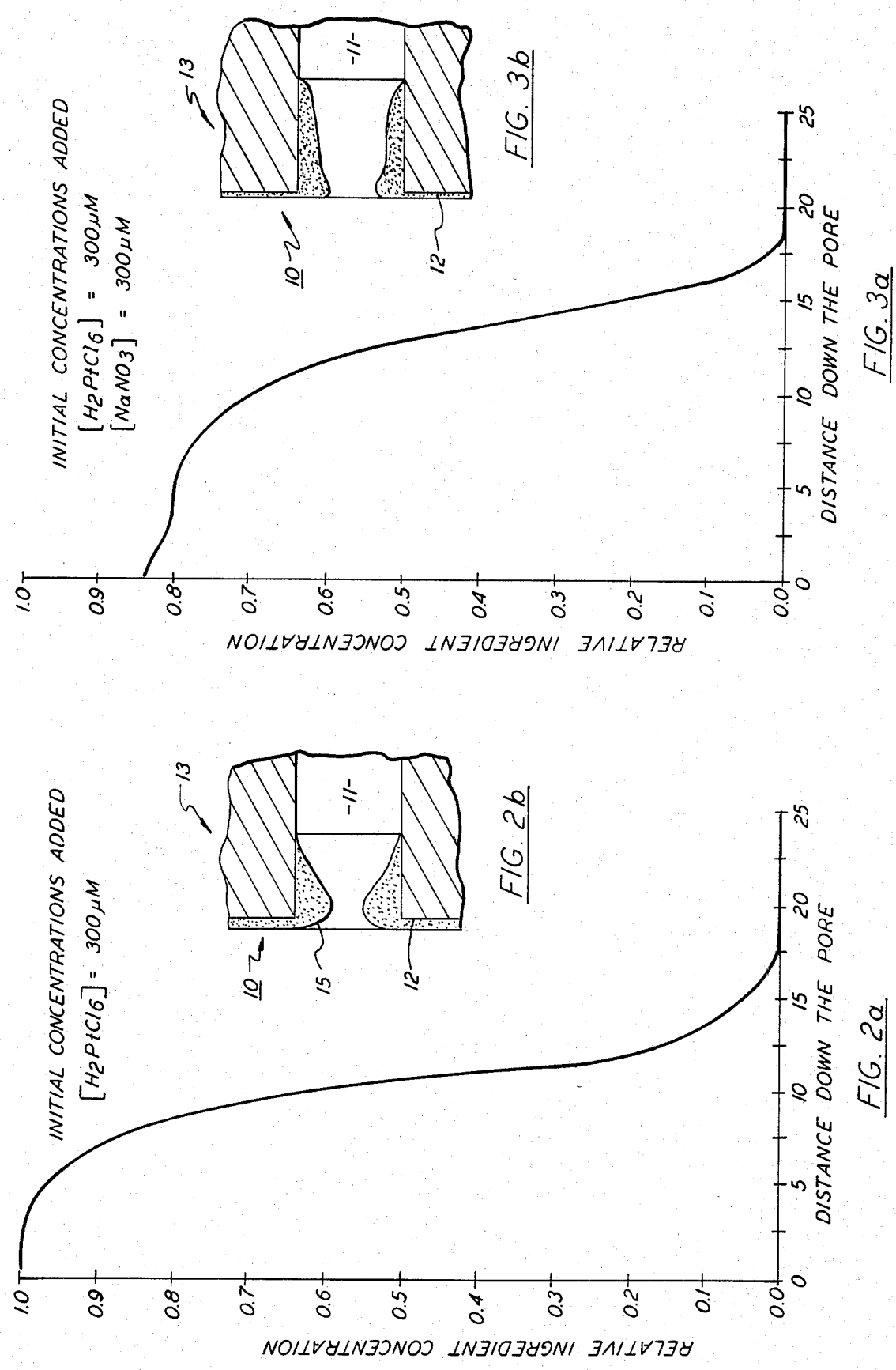

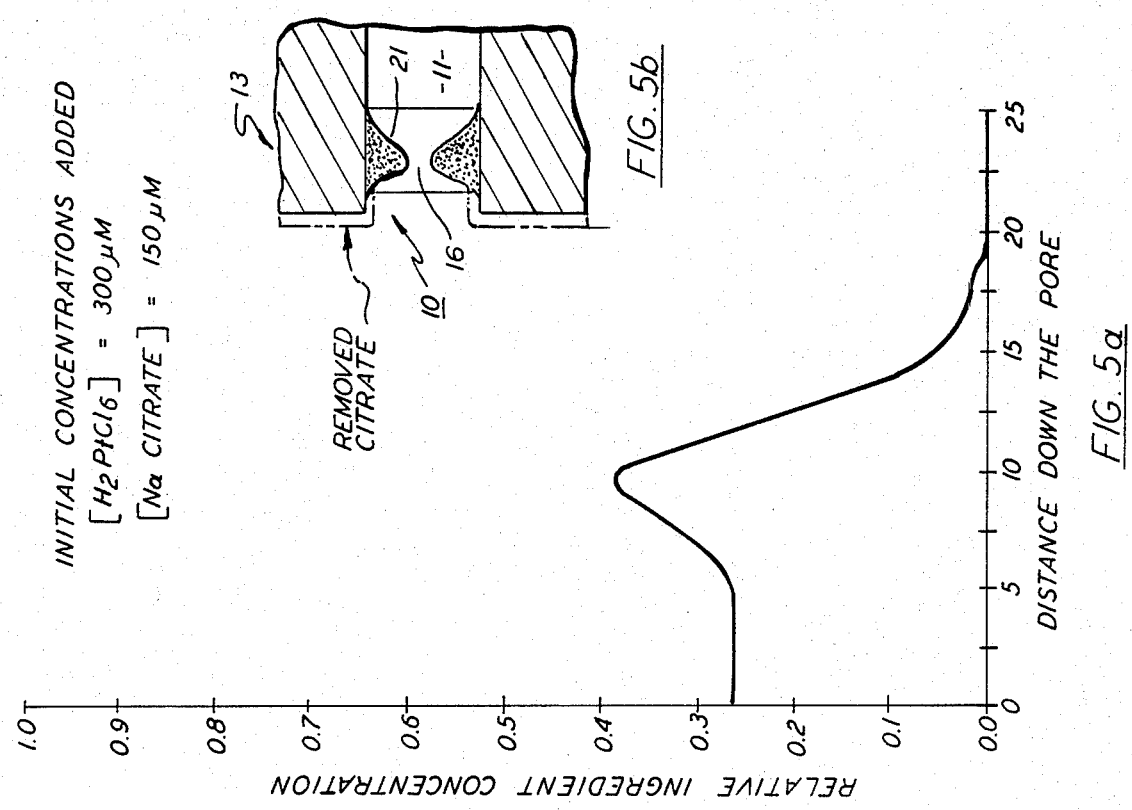
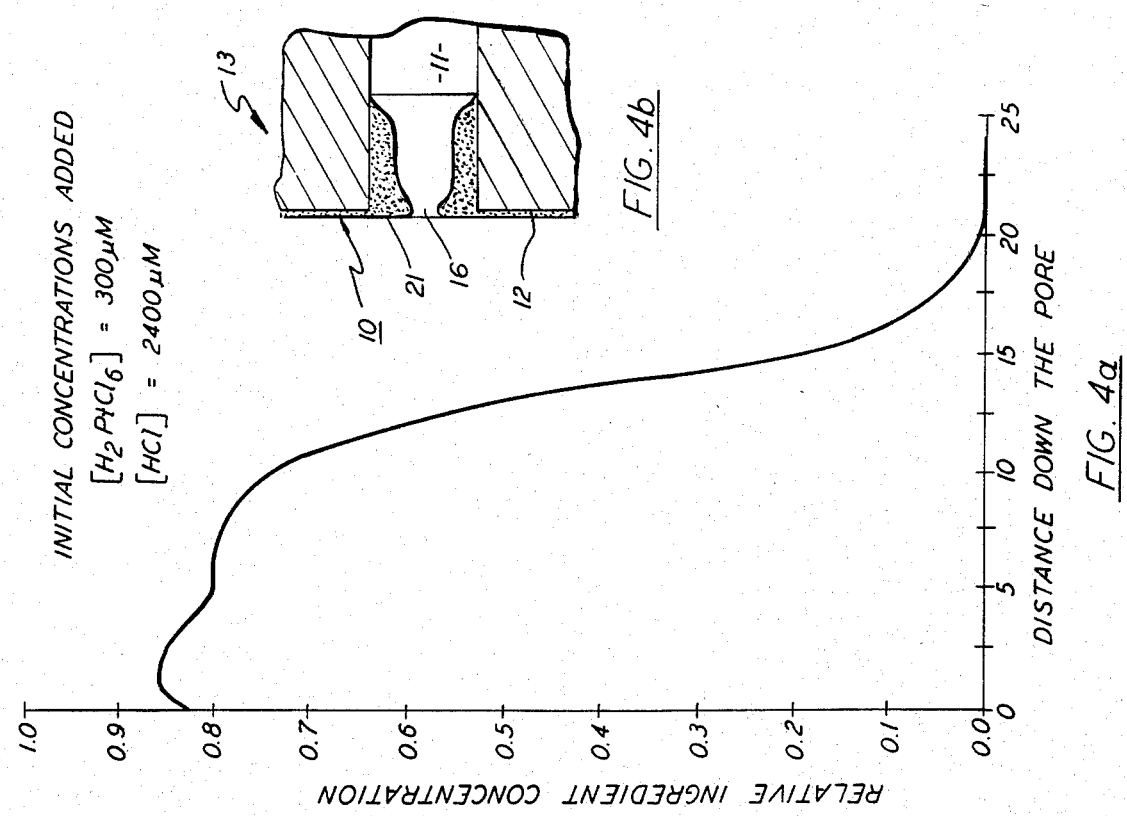

METHOD OF CONTROLLING THE DISTRIBUTION OF A COATING MATERIAL UPON THE SURFACE OF A SUPPORT

BACKGROUND OF THE INVENTION

This invention relates to a method of controlling the adsorption of a material or materials from an aqueous solution onto a support and, in particular, to regulating the ingredients contained in the solution to accurately generate a desired coating on a support. More specifically, this invention relates to a method for controlling the amount and spatial distribution of given materials along the length of a support pore.

In recent years, studies have been undertaken in an effort to better understand the adsorption process in order to more accurately generate concentration profiles on a support. The design of concentration profiles for active catalytic materials has received considerable attention in the automotive industry due to the concern surrounding air pollution by engine exhaust emissions. Metal catalysts have been developed which are capable of oxidizing carbon monoxide and hydrocarbons contained in such exhaust gases. Poisons found in these emissions attack the metal catalysts and rapidly deactivate the catalytic coating within a narrow band near the support surface. Accordingly, efforts have been directed toward developing a system wherein a first metal is adsorbed on the support surface to interact with the poisons while a second metal is adsorbed within pores or small crevices contained in the support. This type of construction is highly effective when the process is not diffusion limited.

The incipient wetness technique is commonly used to prepare highly dispersed metallic materials on porous oxide supports. The pores are impregnated with an aqueous solution containing the active catalytic material which is subsequently adsorbed on the pore walls. The catalytic ingredient is typically added in the form of a dissolved salt. Calcination, reduction or other appropriate pretreatment techniques are generally necessary to convert the impregnated crystallite formed by the salt into a catalytically active form. Any of these conversion steps can affect the concentration profile of the catalytic material.

Generally, when a porous support is placed in an aqueous solution containing adsorbable ions, the more active ions which have a higher affinity for the support will concentrate at the entrance to the pores and produce an eggshell-like coating over the support surface. The coating tends to close the pore openings and thus adversely affects the ability of the coating material or a second adsorptive material from penetrating into the pore. The use of additional ingredients as a means of controlling the concentration profile of platinum on an alumina support was first described by Maatman, R. W., Ind. Eng. Chem., 51 (8), 913 (1959). Uniform profiles were obtained by adding acids to the impregnating solution. More recently, further work by Hegedus et al, Preparation of Catalysts II, Elsevier Scientific Publishing Comp., Amsterdam, (1979) described competing ingredients as site blocking agents. This approach allows for mathematical modeling of specific multicomponent processes wherein the adsorption, transport and kinetics are modeled within the pores and an empirical procedure is developed to fit the specific scheme. It should be noted that these prior techniques neglect the complicated solution—support interface chemistry and the methods offer no explanation as to why specific ingredients produce different concentration profiles. The nature of the adsorption process particularly on a porous support is governed by factors beyond simple transport considerations. Such factors as the acid-base equilibrium of the solution, the chemical and crystal structure of added ingredients and the ionic strength determined by the composition of the system must also be considered when describing the process.

In short, most of the information that has been gathered concerning the generation of concentration profiles has been empirical. There is little in the open literature which theoretically explains how solution ingredients produce a given profile. As will be explained in greater detail below, the amount and uniformity of adsorbed materials can be accurately controlled for any given solution by dividing the ingredients into three readily identifiable classes. Each of these affects the process differently. Desired concentration profiles can thus be accurately modeled and the solution adjusted to produce the desired result.

SUMMARY OF THE INVENTION

It is therefore an object of the present invention to improve processes by which one or more materials are adsorbed from an aqueous solution onto a support surface.

It is a further object of the present invention to accurately control the amount of material adsorbed from an aqueous solution onto a support.

A still further object of the present invention is to improve methods for impregnating the pores of a support with an adsorptive material.

Another object of the present invention is to selectively position desired adsorptive materials along the length of a support pore.

Yet another object of the present invention is to provide a simple method by which a desired concentration profile can be obtained by simply adjusting the concentration of added ingredients contained in the solution.

These and other objects of the present invention are attained by a method of controlling a concentration profile. This includes providing a support that interacts with ions of an adsorbing material contained in an aqueous solution. Additional ingredients from one or more of three specific classes are chosen. The concentration of these ingredients is adjusted to produce a desired concentration profile on the support. The three classes of ingredients involve a first class which modifies the ionic strength of the solution, a second class which modifies the pH of the solution and a third group which modifies the availability of adsorption sites.

BRIEF DESCRIPTION OF THE DRAWINGS

For a better understanding of these and other objects of the present invention, reference is made to the following detailed description of the invention which is to be read in conjunction with the accompanying drawings, wherein:

FIG. 1 is a flow diagram illustrating a method of practicing the present invention;

FIG. 2a is a curve illustrating a standard concentration profile along a support pore for a strongly adsorbing metal, wherein the aqueous solution is free of added ingredients;

FIG. 2b is an enlarged section view of a support pore showing a standard concentration profile for the adsorbable metal;

FIG. 3a is a curve illustrating a concentration profile, wherein an inorganic salt has been added to the solution for modifying the ionic strength of the system;

FIG. 3b is an enlarged section view of a support pore showing the modified concentration profile that is graphically illustrated in FIG. 3a;

FIG. 4a is a curve illustrating a concentration profile that has been modified by adding an ingredient for altering the pH of the solution;

FIG. 4b is an enlarged sectional view of a support pore showing the modified profile that is graphically illustrated in FIG. 4a;

FIG. 5a is a curve illustrating the concentration profile along a support pore, which has been modified by adding a competitive ingredient to the solution;

FIG. 5b is an enlarged sectional view of a support pore showing the modified profile that is graphically illustrated in FIG. 5a; and FIG. 6 is also an enlarged sectional view of a support pore showing two separate active materials spatially distributed along the pore length that were positioned using the teachings of the present invention.

DESCRIPTION OF THE INVENTION

The present invention deals generally with an adsorption process for controlling the amount and spatial distribution of a selected material or materials from an aqueous phase onto a solid support. The invention is applicable but not limited to simple electrolytes such as inorganic acids, inorganic salts, metal ions, metal complexes and large organic acids that are in contact with surfaces containing hydratable oxides subject to protonation-deprotonation reactions in aqueous media. It should be further noted that the invention is not limited by the geometry of the support surface. As will be pointed out below, the present method is ideally suited for use in coating applications where the adsorbable material experiences transport limitations upon the diffusion of the aqueous phase into a pore-like structure. Such applications might include the coating of ceramic substrates, pellets used in a catalytic system, or even in printed circuit boards having small coated holes for providing communication between electrical elements.

As previously noted, the ingredients that are used to modify aqueous solutions can be grouped into three identifiable classes dependent upon the effect that the specific ingredient has on the adsorption process. The first two classes consists of non-potentially determining ions. These ions will not significantly adsorb onto the support surface. The first class of two non-potentially determining ingredients includes simple inorganic electrolytes, which affect the amount of material adsorbed and the depth to which the adsorbed material penetrates a pore-like opening in the support. These first or Class 1 ingredients are used to adjust the ionic strength of the system by altering the double layer thickness and thus the electrostatic attraction at the interface between the solution and the support surface. As the ionic strength is increased, the amount of material adsorbed decreases and the depth of penetration increases.

The second class or Class 2 ingredients includes simple acids or bases. The ingredients of Class 2 alter the pH of the solution. This, in turn, also causes changes in the surface charge at the interface region by altering the chemistry of the support. A change in the solution pH which increases the potential difference between the adsorbing material and the support surface will lead to an increase in the amount of material adsorbed.

The third class or Class 3 ingredients include materials that compete with the primary material for adsorption sites and thus reduce the availability of such sites. The third class of ingredients may be more active than the primary material, and thus have a greater affinity for the support. The more active materials will thus be adsorbed before the primary material and can thus be used to spatially position the primary material within a pore by taking up the adsorption sites in and about the pore entrance. Similarly, a number of adsorbable ingredients can be utilized to align specific materials in a desired order along the length of a pore. Some of the adsorbable materials can further be thermally removed from the support after the concentration profile is completed leaving behind only desired materials. The Class 3 ingredients may include any number of compounds; however, those containing hydroxyl, phosphoryl and carboxyl groups are the strongest and thus the most important ingredients in this class.

It should be noted at this point that the compounds in the third class of ingredients can affect both the ionic strength of the system and the pH of the solution. However, this does not pose a serious problem in the process because these effects can be easily compensated for by adjusting the concentration of Class 1 and Class 2 ingredients. The amount of active material adsorbed and the spatial distribution of the material can be determined by considering the simultaneous competitive adsorption-transport process.

FIG. 1 illustrates a flow diagram by which a desired concentration profile can be modeled and then generated using the teachings of the present invention. For the sake of explanation, it shall be assumed that a porous support is in contact with a solution containing two adsorbable ingredients (Class 3) which are to be coated onto the support and a number (n) of non-adsorbable ingredients of Class 1 and Class 2.

With this starting information, the electrostatic effects of all the ingredients are initially summed as are the pH effects to arrive at one overall effect for each of Class 1 and Class 2 ingredients. The adsorbing compounds and the single Class 1 and Class 2 effects are then used to determine the order in which the compounds will be adsorbed and the effect the ingredients will have on solution surface interface. With this information, the convective transport and diffusion of ions into the support can be determined and a concentration profile model predicted.

Using existing models, a desired profile is generated on the support for the two adsorbing ingredients and the profile compared to the desired profile to see if the results have been attained. If not, the concentration of existing ingredients are adjusted using the teachings of the present invention and/or further ingredients added to the solution to provide a correction.

To observe the effects of different ingredients upon a concentration profile, a technique was devised whereby the adsorption profile of a metal onto an oxide support is obtained. Platinum is used as an adsorbing material and a porous alumina substrate as the support. Platinum adsorbed onto the white surface is yellow and is transformed to a gray color by calcining the sample at about 400° C. The amount of platinum adsorbed controls the intensity of the gray. Photonegatives of the samples are taken that reveal the concentration distribution of the metal as corresponding shades of gray. Scans of solution containing known amounts of ingredients are also taken at the beginning and end of each run using a UV spectrophotometer. The depletion of ingredient concentration is related to the grayness distribution contained in the photonegatives to determine the concentration profile. An electron microprobe may also be used to further check the accuracy of the photographic technique. The flat smooth end face of an alumina pellet is placed in an aqueous solution containing different ingredients. The solution is drawn by capillary action into the exposed pores. Sufficient amounts of platinum are available to coat a maximum of about 0.5% by weight onto the support sample. A one hundred milliliter solution is used to ensure the volume remains constant throughout the test. The solution is constantly stirred to provide uniform mixing of constituents and to bring the concentration levels at the support surface to that of the bulk solution. Ultra violet spectrophotometer scans are taken before and after each coating run to measure the amount of metal adsorbed from the solution. All tests are conducted under isothermal conditions in the absence of room light.

A series of tests using the noted procedure were conducted using different ingredients in solution to verify the control aspects of the three identified classes of ingredients. The initial test was run using hexachloroplatinic acid as a sole ingredient so that a standard profile could be generated for comparing the effects of other ingredients on the system. The results of the initial test are outlined in FIGS. 2a and 2b. FIG. 2a is a graphic representation of the generated profile at the entrance to a single pore. FIG. 2b is a greatly enlarged section view of the pore showing the profile in greater detail.

The platinum in solution is strongly adsorptive and the rate of removal of the metal complex by alumina is related inversely to the depth to which the metal penetrates the pore. Accordingly, the metal ions are removed rapidly from the solution and the coating that is generated has an eggshell appearance. As best seen in FIG. 2b, the entrance to the pore 11 is located within the smooth end face 12 of the pellet 13. The metal profile, generally referenced 10, has a sharp band of material 15 at the pore entrance. The depth of penetration of the metal is relatively shallow.

A second test was conducted, wherein a simple inorganic salt ($NaNO_3$) is added to the solution. The anions and cations of such simple salts have a high affinity for the aqueous phase and thus are ideally suited for use as Class 1 ingredients for altering the electrical double layer. The ingredient thus modifies the amount and uniformity of metal that is adsorbed. The metal ion adsorption is therefore a function of the ionic strength of the solution. As can be seen from FIGS. 3a and 3b, the concentration profile becomes thinner as less material is adsorbed; however, a uniform profile is generated at the pore opening, thus providing for a deeper penetration of material. It should also be noted that increasing the ionic strength of the solution will cause the double layer to contract inwardly toward the support surface, reducing the number of ions adsorbed while producing a more uniform profile because the ingredient alters the metal adsorption characteristics uniformly along the length of the pore.

While adsorption capacity can be adjusted by controlling ionic strength, the impregnation time to saturation is strictly a function of the time needed for the solution to diffuse through the pore. Since the addition of electrolyte affects only the availability of the number of surface sites, a single component model which utilizes individual adsorption isotherms can be developed.

A third run was conducted in which the pH of the solution was changed by adding a simple acid (HCl) to the solution. The effects of this Class 2 ingredient are shown in FIGS. 4a and 4b. It has been long known that pH is a variable that governs the extent of adsorption and that under certain conditions a narrow change in the pH of between 1 and 2 units will produce an increase in adsorption from 0 to 100%. However, under other conditions an increase in the pH beyond certain limits can cause the metal to desorb from the support. It was initially assumed that the cations of bases and the anions of acids actually competed for adsorption sites with the active ions. However, tests show that none of these ions are adsorbed by the support, and it must be concluded that pH and electrostatics are the only two factors that affect the adsorption of the active ingredients.

The profile described in FIGS. 4a and 4b resembles the Class 1 profiles. Here, the amount of adsorption is determined by the sign and magnitude of the Zeta potential. The acid and base additions alter this charge by causing proteanation-deproteanation reactions. The acid addition represented in FIGS. 4a and 4b have reduced the overall charge on the surface, which have in turn caused the platinum to move farther down the pellet to find adsorption sites. Both the Class 1 and Class 2 ingredients have reduced the accessibility of the platinum to reach possible surface adsorption sites.

Lastly, tests were conducted to determine the effects of specifically adsorbing ingredients on the platinum concentration profile. The results of these tests are shown by FIGS. 5a and 5b, wherein sodium citrate has been added to the solution. The citrate has a higher affinity for the alumina than the platinum and specifically adsorbs on the support at the entrance region 16 of the pore. The amount of platinum is considerably reduced when compared to the standard profile because citrate ions have taken up adsorption sites.

As can be seen in FIG. 4b, the location of the platinum has now been moved down the pore and is located predominantly in a region back from the pore entrance. The distance back from the entrance that the platinum band 21 is positioned is dependent upon the concentration of citrate contained in the solution. As should be evident, the band only begins to form after the citrate ions have been depleted to a great extent. As previously noted, compounds containing hydroxyl, phosphoryl and carboxyl groups are well suited for use in spatially positioning the less active metal ions within the pore. The citrate in the present example has been removed from the sample by heating, leaving behind the platinum profile as shown in FIG. 5b.

The use of the present invention provides an attractive method by which catalytic systems can be manufactured for use in the automotive industry. In this application, it is desirous to place a narrow band of platinum at the entrance of support pores contained in an oxide substrate such as alumina. An inner shell of palladium is then positioned deeper within the pores to prevent it from being deactivated by exhaust emission poisons.

As shown in FIG. 6, this construction can be attained in a one step process wherein three active ingredients in the form of hexachloroplatinic acid ($H_2PtCl_6$), acetic acid and hexachloropalladinic acid ($H_2PdCl_6$) are coated onto a porous alumina support. The three ingredients all exhibit a different affinity to the support with the platinum ions being the highest and the palladium the lowest. Accordingly, the platinum will adsorb at the pore entrance as shown. Behind the platinum band is formed an acetate band. Finally, behind the acetate a final band of palladium is formed. Again heating the support to a desired level causes the acetate to be thermally removed from the system leaving behind the desired structure. Using the control method herein disclosed, the concentration profiles of the metals can be closely regulated to provide a desired configuration.

While this invention has been described with specific reference to the above noted method, it should be clear to one skilled in the art that the invention is not limited by this disclosure. For example, although the invention has been described in regard to supports having a strong affinity to certain ions in solution, it is envisioned that the support might be separately charged to attract desirous ions to the support surface without departing from the teachings of the present invention.

We claim:

1. A method of controlling the distributing of a coating material upon the surface of a support that comprises the steps of providing an alumina support that assumes a surface charge by means of protonation-deprotonation processes when placed in an aqueous solution, placing said support in an aqueous solution containing primary adsorbable coating ions of platinum having a charge opposite the charge assumed by the support whereby the platinum ions are adsorbed onto the alumina support surface, the concentration of said platinum ions in the solution being able to satisfy the adsoprtion sites on the surface of the support, said solution further containing two soluble, non-adsorbable, control ingredients for regulating the coating process that includes sodium nitrate for adjusting the resistence of the double layer existing at the support surface to the adsorption of platinum ions onto the surface and hydrochloric acid for adjusting the charge on the support surface, and adjusting the concentration of the sodium nitrate and hydrochloric acid in the solution to generate a coating having a desired distribution of platinum upon the surface of the support.

2. The method of claim 1 wherein said alumina support contains a plurality of pores and further includes the steps of adding palladium ions to the solution having a lesser attraction to the alumina support than said platinum ions and adjusting the concentration of the platinum ions to deposit the platinum at the entrance to the pores and the palladium deeper within the pores.

* * * * *